United States Patent [19]
Saito et al.

[11] Patent Number: 5,406,551
[45] Date of Patent: Apr. 11, 1995

[54] METHOD AND APPARATUS FOR DIGITAL SIGNAL TRANSMISSION USING ORTHOGONAL FREQUENCY DIVISION MULTIPLEXING

[75] Inventors: Masafumi Saito; Toru Kuroda; Shigeki Moriyama; Tomohiro Saito; Masayuki Takada; Osamu Yamada, all of Tokyo, Japan

[73] Assignee: Nippon Hoso Kyokai, Tokyo, Japan

[21] Appl. No.: 9,819

[22] Filed: Jan. 27, 1993

[30] Foreign Application Priority Data

Jan. 31, 1992 [JP] Japan .................................. 4-017067

[51] Int. Cl.⁶ ............................................ H04J 11/00
[52] U.S. Cl. .................................. 370/19; 375/99
[58] Field of Search .................. 370/19, 20, 21, 50, 370/11, 69.1, 71, 18, 57; 375/38, 39, 94, 99, 116

[56] References Cited

U.S. PATENT DOCUMENTS

| | | | |
|---|---|---|---|
| 3,885,217 | 5/1975 | Cintron | 375/38 |
| 4,434,499 | 2/1984 | Motsch et al. | 375/38 |
| 4,881,245 | 11/1989 | Walker et al. | 375/38 |
| 5,050,188 | 9/1991 | Dirr | 375/38 |
| 5,228,025 | 7/1993 | Le Floch et al. | 370/70 |
| 5,243,627 | 9/1993 | Betts et al. | 375/39 |
| 5,251,237 | 10/1993 | Baier | 375/99 |

FOREIGN PATENT DOCUMENTS

0441731 5/1991 European Pat. Off. .
9120137 5/1991 WIPO .

OTHER PUBLICATIONS

European Search Report, Application No. 93101389.0 dated Mar. 11, 1993.
LeFloch, et al.: Digital Sound Broadcasting to Mobile Receivers: pp. 493–503: 1989 IEEE.

*Primary Examiner*—Douglas W. Olms
*Assistant Examiner*—Shick Hom
*Attorney, Agent, or Firm*—Allegretti & Witcoff, Ltd.

[57] ABSTRACT

A digital signal transmission using OFDM modulation scheme in which the valid transmission data can be reproduced without requiring a recovery of the carriers at a receiver side. On a transmitter side, the transmission data sequence in which predetermined reference data for each carrier are placed among valid transmission data is modulated according to an orthogonal frequency division multiplexing (OFDM) modulation scheme using a plurality of carriers and obtained OFDM transmission signals are transmitted. On a receiver side, the received OFDM transmission signals are demodulated to obtain received data sequence containing valid received data and received reference data, and the valid transmission data are estimated from the received data sequence according to the valid received data, the received reference data, and the predetermined reference data for each carrier.

20 Claims, 5 Drawing Sheets

METHOD AND APPARATUS FOR DIGITAL SIGNAL TRANSMISSION USING ORTHOGONAL FREQUENCY DIVISION MULTIPLEXING

BACKGROUND OF THE INVENTION

1. Field of the Invention

The present invention relates to a digital signal transmission suitable for a digital broadcasting to mobile receivers, and more particularly, to a digital signal transmission using an OFDM (Orthogonal Frequency Division Multiplexing) modulation scheme.

2. Description of the Background Art

A digital signal transmission using an OFDM modulation scheme (referred hereafter as the OFDM digital signal transmission scheme) in which the digital signals are transmitted by using a number of mutually orthogonal carriers is known to have various advantages such as its capability to deal with multi-paths, its relatively high frequency utilization efficiency, and its nearly Gaussian white noise like spectrum which causes very little interference with other communication services. For these reasons, the OFDM modulation scheme is considered to be particularly suitable for the application such as a digital audio broadcasting to mobile receivers.

However, in comparison with a conventionally known digital modulation scheme using a single carrier, it is rather difficult in this OFDM modulation scheme to make a coherent demodulation by recovering carriers at a receiver side. For this reason, in order to apply the OFDM digital signal transmission scheme to a conventionally developed digital sound broadcasting in which each carrier is to be QPSK (Quadrature Phase Shift Keying) modulated, a signal transmission must be realized by using differential modulation and demodulation.

On the other hand, in recent years, the OFDM modulation scheme has also been attracting attentions in view of its application to the digital TV signal transmission. In such an application, it is preferable to use a multi-level modulation such as 16 QAM (Quadrature Amplitude Modulation) to each carrier so as to increase the transmission bit rate.

However, in a case of using the multi-level modulation such as 16 QAM in which the data are carried not only by the phases of the signals but also by the amplitudes of the signals, it is difficult to reproduce the transmitted data by using the differential demodulation without making a recovery of carriers at a receiver side.

In order to cope with this problem, it is possible to consider a scheme in which a transmitter side provides reference data for the amplitude and the phase of each carrier at predetermined positions within each transmission signal frame such that a receiver side can reproduce valid transmission data according to the reference data transmitted by the transmission signals.

However, this type of scheme is associated with the following problems.

Namely, in a case the reference data for all the carriers are transmitted by one symbol, if the average power of the reference data is larger than the average power of the valid transmission data, the average power of the symbol for transmitting the reference data will become undesirably larger than the average power of the other symbols for transmitting the valid transmission data.

In addition, in such a case in which the reference data for all the carriers are transmitted by only one symbol, if the symbol for transmitting the reference data has an error, a very long burst error will be caused.

Also, in a case only one value is used for the reference data, the signal peak level will be large such that the signal transmission will be easily influenced by the non-linearity of the transmission path.

Consequently, there has been no conventionally known OFDM digital signal transmission scheme in which the amplitude and phase reference data can be interleaved in the transmission signals, and the valid transmission data can be demodulated by using the reference data without requiring a recovery of the carriers at a receiver side.

SUMMARY OF THE INVENTION

It is therefore an object of the present invention to provide a method and an apparatus for digital signal transmission using OFDM modulation scheme in which the valid transmission data can be reproduced without requiring a recovery of the carriers at a receiver side.

It is therefore an object of the present invention to provide a method and an apparatus for digital signal transmission using OFDM modulation scheme in which the increase of the signal power and the signal peak level due to the transmission of the amplitude and phase reference data can be suppressed.

It is therefore an object of the present invention to provide a method and an apparatus for digital signal transmission using OFDM modulation scheme in which the influence of an error in the amplitude and phase reference data on the entire transmission signals can be reduced.

According to one aspect of the present invention there is provided a method for digital signal transmission, comprising the steps of: (a) obtaining transmission data sequence by placing predetermined reference data for each carrier among valid transmission data, the predetermined reference data indicating amplitude and phase of prescribed reference points; (b) modulating a plurality of carriers with the transmission data sequence obtained at the step (a) according to an orthogonal frequency division multiplexing (OFDM) modulation scheme to obtain OFDM transmission signals; (c) transmitting the OFDM transmission signals obtained at the step (b) to a transmission path; (d) receiving the OFDM transmission signals from the transmission path; (e) demodulating the OFDM transmission signals received at the step (d) to obtain received data sequence containing valid received data and received reference data; and (f) estimating the valid transmission data used at the step (a) from the received data sequence obtained at the step (e) according to the valid received data, the received reference data, and the predetermined reference data for each carrier.

According to another aspect of the present invention there is provided a transmitter device for digital signal transmission, comprising: means for obtaining transmission data sequence by placing predetermined reference data for each carrier among valid transmission data, the predetermined reference data indicating amplitude and phase of prescribed reference points; modulator means for modulating a plurality of carriers with the transmission data sequence obtained by the obtaining means according to an orthogonal frequency division multiplexing (OFDM) modulation scheme to obtain OFDM transmission signals; and means for transmitting the OFDM transmission signals obtained by the modulator means to a transmission path.

According to another aspect of the present invention there is provided a receiver device for digital signal transmission, comprising: means for receiving transmission signals from a transmission path, the transmission signals being obtained by modulating a plurality of carriers with transmission data sequence in which predetermined reference data for each carrier are placed among valid transmission data, according to an orthogonal frequency division multiplexing (OFDM) modulation scheme, the predetermined reference data indicating amplitude and phase of prescribed reference points; demodulator means for demodulating the transmission signals received by the receiving means to obtain received data sequence containing valid received data and received reference data; and means for estimating valid transmission data from the received data sequence obtained by the demodulator means according to the valid received data, the received reference data, and the predetermined reference data for each carrier.

Other features and advantages of the present invention will become apparent from the following description taken in conjunction with the accompanying drawings.

DETAILED DESCRIPTION OF THE PREFERRED EMBODIMENTS

Figure 1:
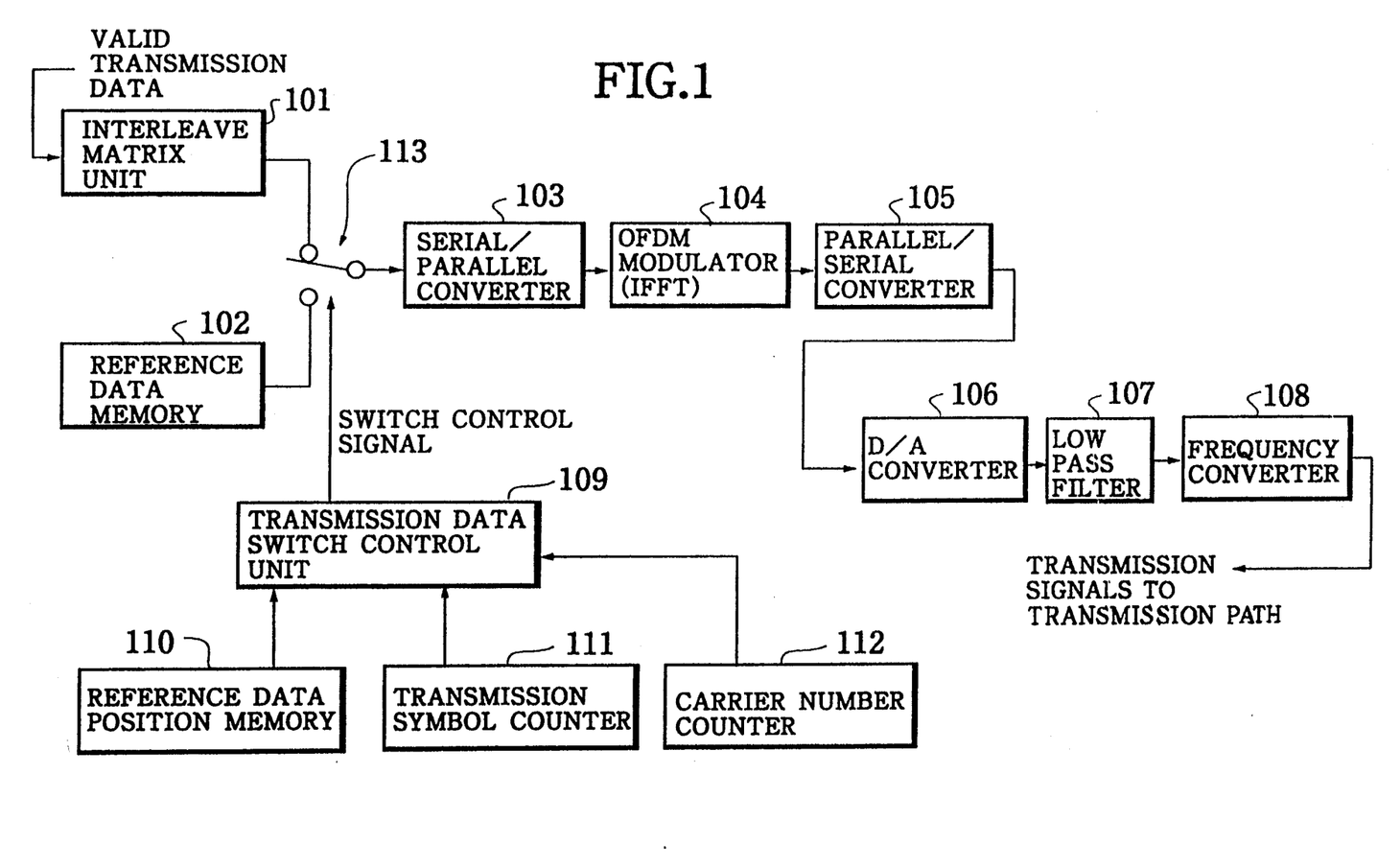
FIG. 1 is a block diagram of a transmitter device in one embodiment of an apparatus for digital signal transmission according to the present invention.
Figure 2:
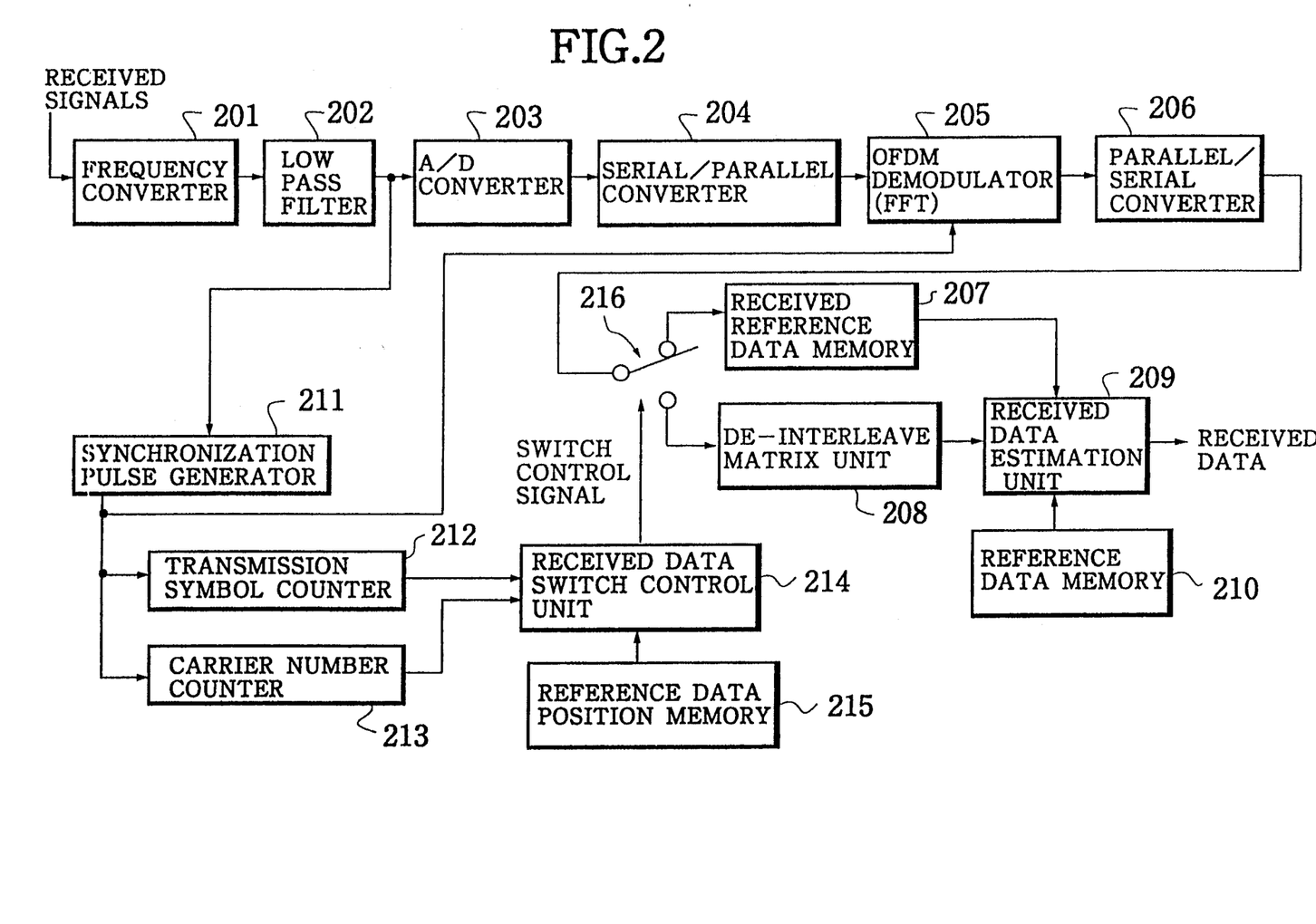
FIG. 2 is a block diagram of a receiver device in one embodiment of an apparatus for digital signal transmission according to the present invention.

Referring now to FIGS. 1 and 2, one embodiment of an apparatus for digital signal transmission according to the present invention will be described in detail.

In this embodiment, the apparatus comprises a transmitter device shown in FIG. 1 and a receiver device shown in FIG. 2.

The transmitter device of FIG. 1 comprises: an interleave matrix unit 101 for interleaving valid transmission data entered thereto; a reference data memory 102 for memorizing predetermined amplitude and phase reference data for each carrier; a serial/parallel converter 103 connected to output sides of the interleave matrix unit 101 and the fixed reference data memory 102 through a transmission data switch 113; an OFDM modulator 104 connected to an output side of the serial/parallel converter 103; a parallel/serial converter 105 connected to an output side of the OFDM modulator 104; a D/A converter 106 connected to an output side of the parallel/serial converter 105; a low pass filter 107 connected to an output side of the D/A converter 106; and a frequency converter 108 connected to an output side of the low pass filter 107 which outputs transmission signals to be transmitted to a transmission path.

In addition, the transmitter device of FIG. 1 further comprises: a transmission data switch control unit 109 for controlling the transmission data switch 113, so as to selectively connect one of the outputs of the interleave matrix unit 101 and the fixed reference data memory 102 to the serial/parallel converter 103; and a reference data position memory 110, a transmission symbol counter 111, and a carrier number counter 112, all of which are connected to the transmission data switch control unit 109.

The receiver device of FIG. 2 comprises: a frequency converter 201 to which the received signals received from the transmission path are entered; a low pass filter 202 connected to an output side of the frequency converter 201; an A/D converter 203 connected to an output side of the low pass filter 202; a serial/parallel converter 204 connected to an output side of the A/D converter 203; an OFDM demodulator 205 connected to an output side of the serial/parallel converter 204; a parallel/serial converter 206 connected to an output side of the OFDM demodulator 205; a received reference data memory 207 connected to an output side of the parallel/serial converter 206 through a received data switch 216; a de-interleave matrix unit 208 connected to an output side of the parallel/serial converter 206 through a received data switch 216; a received data estimation unit 209 connected to an output side of the de-interleave matrix unit 208 which outputs received data; and a reference data memory 210 connected to the received data estimation unit 209.

In addition, the receiver device of FIG. 2 further comprises: a synchronization pulse generator 211 connected between the low pass filter 202 and the OFDM demodulator 205; a received data switch control unit 214 for controlling the received data switch 216, so as to selectively connect the output of the parallel/serial converter 206 to one of the received reference data memory 207 and the de-interleave matrix unit 208; a transmission symbol counter 212 and a carrier number counter 213, both of which are connected between the frame and symbol synchronization pulse generator 211 and the received data switch control unit 214; and a reference data position memory 215 connected to the received data switch control unit 214.

Now, the operations of the transmitter device of FIG. 1 and the receiver device of FIG. 2 will be described in detail.

First, the transmitter device of FIG. 1 operates as follows.

In this transmitter device of FIG. 1, the valid transmission data are interleaved at the interleave matrix unit 101, and the interleaved valid transmission data obtained by the interleave matrix unit 101 and the predetermined amplitude and phase reference data memorized by the reference data memory 102 are supplied as a transmission data sequence to the serial/parallel converter 103 through the transmission data switch 113 under the control by the transmission data switch control unit 109.

Figure 3:
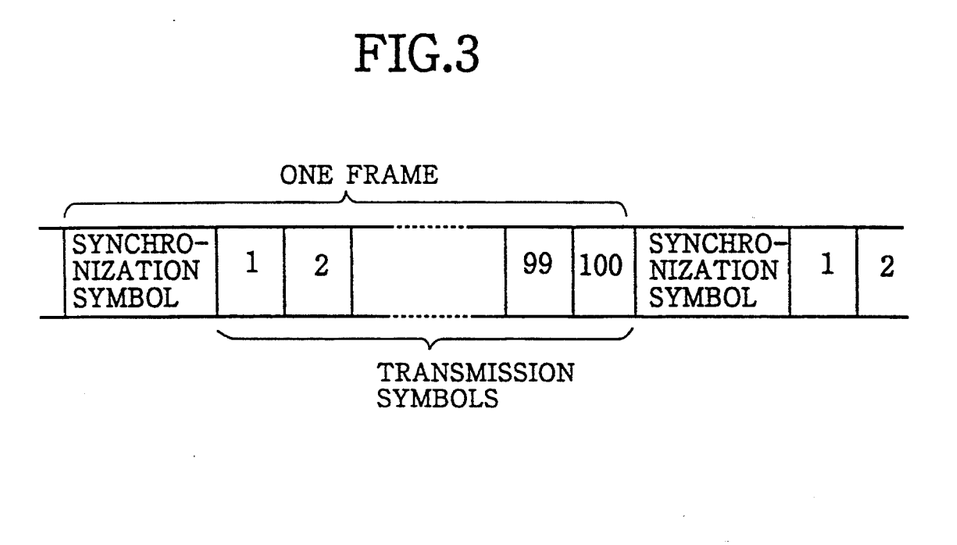
FIG. 3 is a diagram of an exemplary frame configuration in transmission data sequence to be used in one embodiment of a method for digital signal transmission according to the present invention.

In this embodiment, the transmission data sequence is formed in units of frames having a frame configuration as shown in FIG. 3, where each frame includes a synchronization symbol and 100 transmission symbols.

Figure 4:
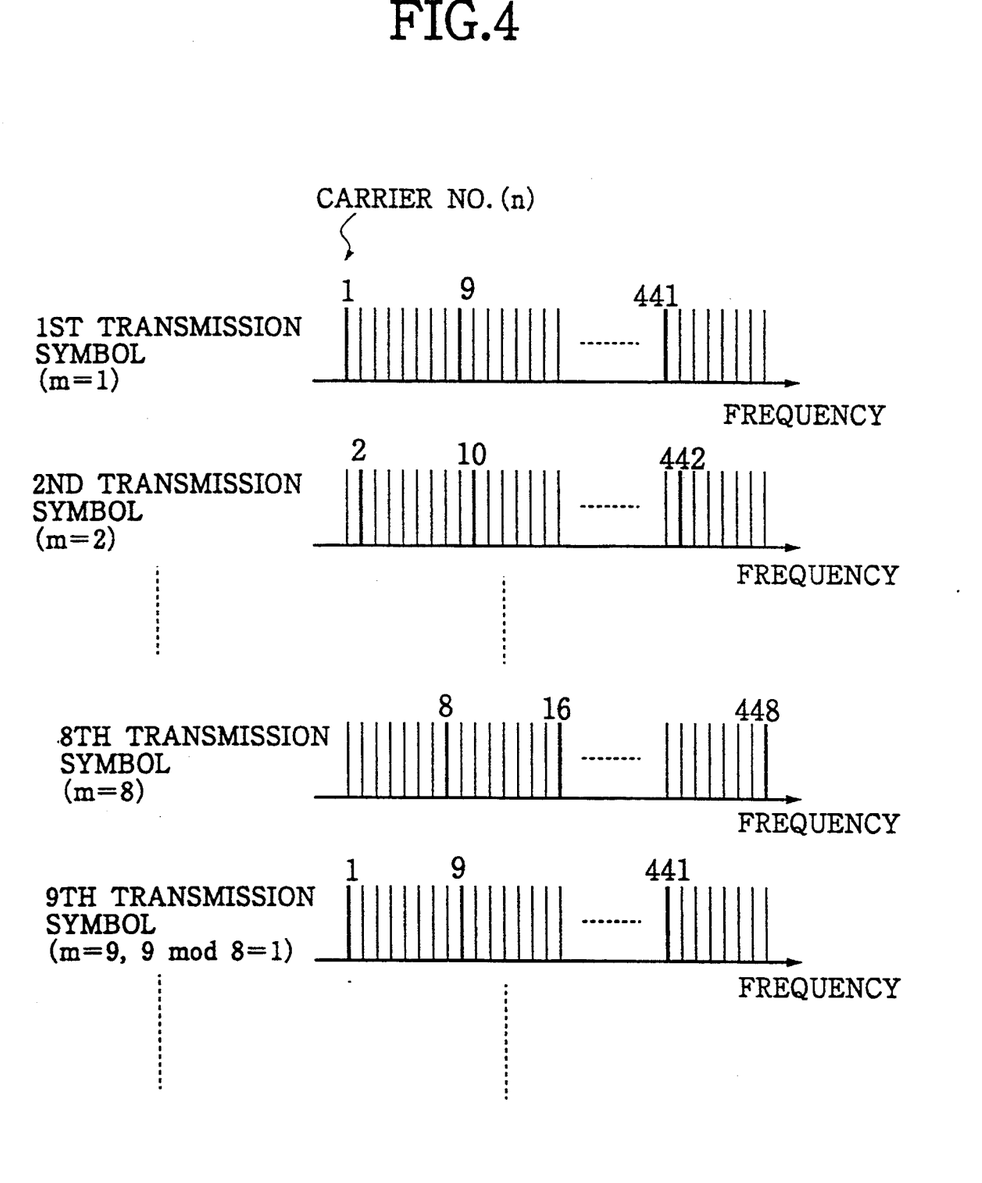
FIG. 4 is a diagram showing carriers for carrying amplitude and phase reference data in each transmission symbol in the transmission data sequence to be used in one embodiment of a method for digital signal transmission according to the present invention.

In this transmission data sequence, the valid transmission data and the reference data are arranged as shown in FIG. 4. Namely, in the m-th transmission symbol, the n-th carrier carries the reference data for the n-th carrier only when a condition of "n mod 8=m mod 8" holds. For example, in a case using 448 carriers in each transmission symbol, in the 1st transmission symbol (m=1), the reference data are carried by the 1st, 9th, . . . , 441th carriers, while the remaining carriers carries the valid transmission data, and so on. In FIG. 4, the carriers for carrying the reference data in each transmission symbol are indicated by bold lines accompanied by their carrier numbers on top, while the carriers for carrying the valid transmission data are indicated by thin lines without carrier numbers.

It is to be noted here that, in general, the condition "n mod k=m mod k" can be used in determining the carriers to carry the reference data in each transmission symbol. The appropriate value for k will be dependent on various signal transmission conditions.

It is also to be noted here that it is preferable to use different reference data for different carriers, in order to suppress the signal peak level. Thus, in FIG. 4, the reference data for the 1st carrier carried by the 1st carrier in the 1st transmission symbol is preferably be different from the reference data for the 9th carrier carried by the 9th carrier in the 1st transmission symbol.

This arrangement of the transmission data sequence as shown in FIG. 4 is realized by the switching operation by the transmission data switch 113 under the control by the transmission data switch control unit 109. The transmission data switch control unit 109 controls the transmission data switch 113 by the switch control signal determined according to the condition such as "n mod 8=m mod 8" memorized by the reference data position memory 110, a current transmission symbol number (m) counted by the transmission symbol counter 111, and a current carrier number (n) counted by the carrier number counter 112.

The serial/parallel converter 103 then applies the serial to parallel conversion to the supplied transmission data sequence in units of bits to be transmitted by one symbol, and supplies the serial/parallel converted transmission data sequence to the OFDM modulator 104 in units of transmission symbols.

The OFDM modulator 104 obtains the baseband time base waveform for each transmission symbol by applying the Inverse Fast Fourier Transform (IFFT) to the supplied serial/parallel converted transmission data sequence in units of transmission symbols.

Figure 5A:
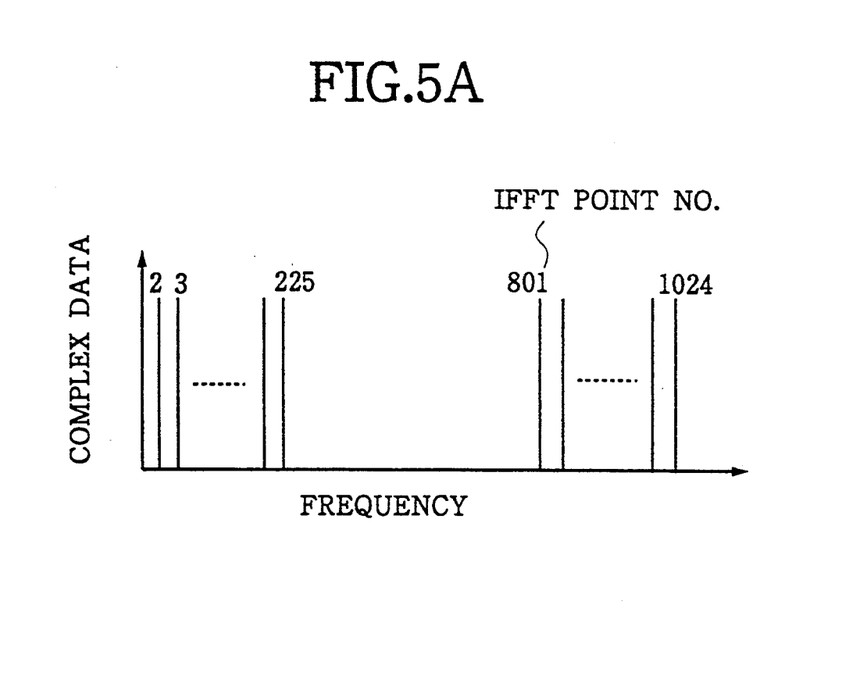
FIG. 5A is a graph showing frequency distribution of transmission data to be entered into an OFDM modulator in the transmitter of FIG. 1.
Figure 5B:
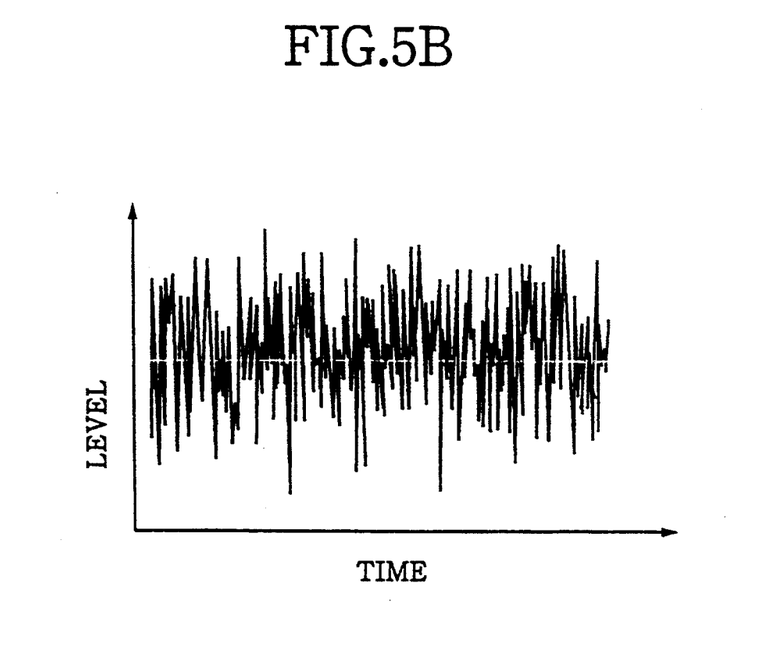
FIG. 5B is a graph showing a baseband time base waveform to be outputted from an OFDM modulator in the transmitter of FIG. 1.

For example, in a case a number of carriers in each transmission symbol is 448 and a number of IFFT points to be used in the IFFT is 1024, the serial/parallel converted transmission data sequence entered into the OFDM modulator 104 can be represented as 448 complex data along a frequency axis as shown in FIG. 5A, where the carrier No. 1 to 224 are assigned to the IFFT point No. 2 to 225, respectively, and the carrier No. 225 to 448 are assigned to the IFFT point No. 801 to 1024, respectively. When the IFFT is applied to this serial/parallel converted transmission data sequence of FIG. 5A, the baseband time base waveform as shown in FIG. 5B can be obtained.

Figure 6:
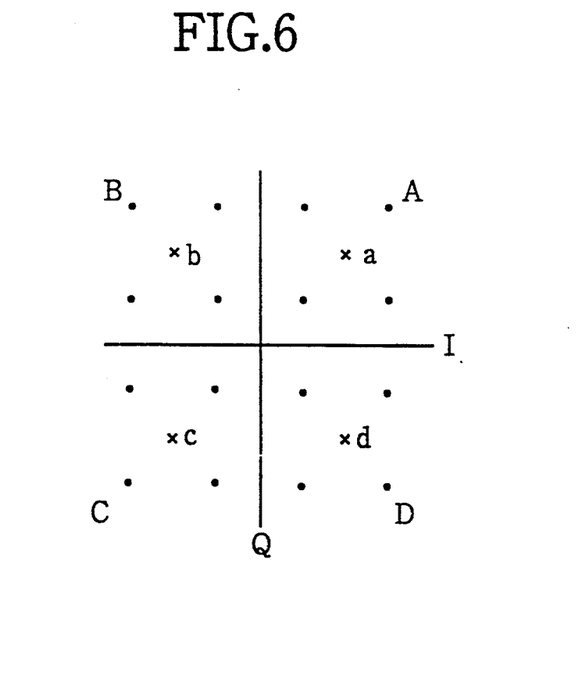
FIG. 6 is a diagram of an exemplary signal points arrangement for each carrier modulated by 16 QAM according to one embodiment of a method for digital signal transmission according to the present invention.

Here, in a case of applying 16 QAM (Quadrature Amplitude Modulation) to each carrier, the signal points arrangement as shown in FIG. 6 may be used. In this case, the reference data for each carrier can be set up in any desired manner. For example, the reference data for this carrier may indicate four corner points A, B, C, and D of the signal points for this carrier. Alternatively, the reference data for this carrier may indicate four points a, b, c, and d which are not a part of the signal points for this carrier. The reference data for each carrier may also indicate any number of points other than four.

The further detail of the general operation of an OFDM modulator can be found in Le Floch et al, "Digital Sound Broadcasting to Mobile Receivers", IEEE Transactions on Consumer Electronics. Vol. 35, No. 3, pp. 493–503, August 1989.

The output of the OFDM modulator 104 is then supplied to the parallel/serial converter 105 in units of transmission symbols, and the parallel/serial converter 105 applies the parallel to serial conversion to the output of the OFDM modulator 104 to obtain a time base waveform. The parallel to serial converted baseband time base waveform is then D/A converted by the D/A converter 106, low pass filtered by the low pass filter 107, and frequency converted by the frequency converter 108, such that the OFDM transmission signals at a desired radio transmission frequency can be obtained. The obtained OFDM transmission signals are then transmitted to the transmission path toward the receiver device of FIG. 2.

Next, the receiver device of FIG. 2 operates as follows.

In the receiver device of FIG. 2, the received signals received from the transmission path are converted into the baseband signals by the frequency converter 201 and the low pass filter 202. The obtained baseband signals are then A/D converted by the A/D converter 203, and serial to parallel converted by the serial/parallel converter 204, and supplied to the OFDM demodulator 205.

Meanwhile, the baseband signals obtained at the low pass filter 202 are also supplied to the synchronization pulse generator 211, which generates the frame synchronization pulses and the symbol synchronization pulses from the synchronization symbol in each frame of the baseband signals.

The OFDM demodulator 205 carries out the inverse operation of the operation carried out by the OFDM modulator 104 in the transmitter device of FIG. 1. Namely, the OFDM demodulator 205 obtains received data sequence in a form of complex data along the frequency axis by applying the Fast Fourier Transform (FFT) to the supplied baseband signals in units of transmission symbols, in accordance with the symbol synchronization pulses generated by the synchronization pulse generator 211.

The received data sequence obtained by the OFDM demodulator 205 is then parallel to serial converted by the parallel/serial converter 206, and then separated into the valid received data and the amplitude and phase reference data by the received data switch 216 under the control by the received data switch control unit 214. The amplitude and phase reference data separated from the received data sequence are supplied to the received reference data memory 207, while the valid received data separated from the received data sequence are supplied to the de-interleave matrix unit 208.

Here, the received data switch control unit 214 realizes this separation of the amplitude and phase reference data and the valid received data by controlling the switching operation of the received data switch 216 by using the switch control signal determined according to the same condition as that memorized by the reference data position memory 110 in the transmitter device of FIG. 1 such as "n mod 8=m mod 8" which is memorized by the reference data position memory 215, a current transmission symbol number (m) counted by the transmission symbol counter 212, and a current carrier number (n) counted by the carrier number counter 213. These transmission symbol counter 212 and the carrier number counter 213 operates in accordance with the frame synchronization pulses and the symbol synchronization pulses generated by the synchronization pulse generator 211.

The valid received data separated at the received data switch 216 are then de-interleaved by the de-interleave matrix unit 208, while the amplitude and phase reference data separated at the received data switch 216 are temporarily stored in the received reference data memory 207.

Finally, the received data estimation unit 209 estimates the valid transmission data transmitted by the transmitter device of FIG. 1, for each carrier in each transmission symbol, according to the received amplitude and phase reference data stored in the received reference data memory 207, the de-interleaved valid received data supplied from the de-interleave matrix unit 208, and the predetermined amplitude and phase reference data for each carrier memorized by the reference data memory 210 which are identical to those memorized by the reference data memory 102 of the transmitter device of FIG. 1, as follows.

Namely, for each carrier in each transmission symbol, the valid received data $D_{RX}$, the received reference data $S_{RX}$, the predetermined reference data $S_{TX}$, and the valid transmission data $D_{TX}$ have the following relationship (1):

$$D_{TX}/D_{RX}=S_{TX}/S_{RX} \quad (1)$$

so that the valid transmission data $D_{TX}$ can be estimated from the valid received data $D_{RX}$, the received reference data $S_{RX}$, and the predetermined reference data $S_{TX}$, according to the following equation (2):

$$D_{TX}=D_{RX} \cdot S_{TX}/S_{RX} \quad (2)$$

where each of the valid received data $D_{RX}$, the received reference data $S_{RX}$, the predetermined reference data $S_{TX}$, and the valid transmission data $D_{TX}$ is given as a complex quantity.

In this embodiment, it becomes possible to realize the digital signal transmission using OFDM modulation scheme in which the valid transmission data can be reproduced without requiring a recovery of the carriers at a receiver side, because the valid transmission data are estimated by using the reference data transmitted along with the valid transmission data in the transmission signals.

In addition, in this embodiment, it also becomes possible to realize the digital signal transmission using OFDM modulation scheme in which the increase of the signal power due to the transmission of the reference data can be suppressed, because the reference data are uniformly distributed over a plurality of transmission symbols such that every transmission symbol has approximately equivalent average signal power.

Moreover, in this embodiment, it also becomes possible to realize the digital signal transmission using OFDM modulation scheme in which the increase of the signal peak level due to the transmission of the reference data can be suppressed, because the reference data are distributed over a plurality of transmission symbols such that each transmission symbol carries the reference data for only a fraction of the carriers.

Furthermore, in this embodiment, it also becomes possible to realize the digital signal transmission using OFDM modulation scheme in which the influence of an error in the amplitude and phase reference data on the entire transmission signals can be reduced, because the reference data are distributed over a plurality of transmission symbols and each transmission symbol carries the reference data for only a fraction of the carriers so that the transmission error of one transmission symbol do not cause the long burst error, as long as the neighboring transmission symbols are transmitted without errors.

It is to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A method for digital signal transmission frequency division multiplexing, comprising the steps of:
    (a) obtaining transmission data sequence by placing predetermined reference data for each carrier of a plurality of carriers among valid transmission data, the predetermined reference data indicating amplitude and phase of prescribed reference points;
    (b) modulating said plurality of carriers with the transmission data sequence obtained at the step (a) according to an orthogonal frequency division multiplexing (OFDM) modulation schedule to obtain OFDM transmission signals;
    (c) transmitting the OFDM transmission signals obtained at the step (b) to a transmission path;
    (d) receiving the OFDM transmission signals from the transmission path;
    (e) demodulating the OFDM transmission signals received at the step (d) to obtain received data sequence containing valid received data and received reference data; and
    (f) estimating the valid transmission data used at the step (a) from the received data sequence obtained at the step (e) according to the valid received data, the received reference data, and said predetermined reference data for each carrier.

2. The method of claim 1, wherein at the step (a) the transmission data sequence is obtained in units of frames, where each frame contains a plurality of transmission symbols and each transmission symbol is carried by the plurality of carriers, and wherein at the step (f), the valid transmission data $D_{TX}$ is estimated from the valid received data $D_{RX}$ the received reference data $S_{RX}$ and the predetermined reference data $S_{TX}$ by calculating an equation:

$$D_{TX}=D_{RX} \cdot S_{TX}/S_{RK}$$

where $D_{TX}$, $D_{RK}$, and $S_{RX}$ are complex numbers, for each carrier in each transmission symbol.

3. The method of claim 1, wherein the predetermined reference data for each carrier is set to be different from the predetermined reference data for carriers other than said each carrier.

4. The method of claim 1, wherein at the step (a), the transmission data sequence is obtained in units of frames, where each frame contains a plurality of transmission symbols and each transmission symbol is carried by the plurality of carriers, and the predetermined reference data are placed among the valid transmission data such that a fraction of said plurality of carriers for carrying said each transmission symbol carry the predetermined reference data for the fraction of said plurality of carriers while a remaining part of said plurality of carriers for carrying said each transmission symbol carry the valid transmission data, and the predetermined reference data for all of said plurality of carriers are distributed among a prescribed number of the transmission symbols.

5. The method of claim 4 wherein at the step (a), the predetermined reference data are placed among the valid transmission data such that, in an m-th transmission symbol, an n-th carrier carries the predetermined reference data for the n-th carrier only when a condition of "n mod k = m mod k" holds, where k, m, and n are integers.

6. The method of claim 1, wherein at the step (b), each of said plurality of carriers is modulated by a multi-level modulation.

7. A transmitter device for digital signal transmission frequency division multiplexing, comprising:
means for obtaining transmission data sequence by placing predetermined reference data for each carrier of a plurality of carriers among valid transmission data, the predetermined reference data indicating amplitude and phase of prescribed reference points;
modulator means for modulating said plurality of carriers with the transmission data sequence obtained by the obtaining means according to an orthogonal frequency division multiplexing (OFDM) modulation scheme to obtain OFDM transmission signals; and
means for transmitting the OFDM transmission signals obtained by the modulator means to a transmission path.

8. The transmitter device of claim 7, wherein the obtaining means obtains the transmission data sequence by using the predetermined reference data for each carrier which is set to be different from the predetermined reference data for carriers other than said each carrier.

9. The transmitter device of claim 7, wherein the obtaining means obtains the transmission data sequence in units of frames, where each frame contains a plurality of transmission symbols and each transmission symbol is carried by the plurality of carriers, and the obtaining means obtains the transmission data sequence by placing the predetermined reference data among the valid transmission data such that a fraction of said plurality of carriers for carrying said each transmission symbol carry the predetermined reference data while a remaining part of said plurality of carriers for carrying said each transmission symbol carry the valid transmission data, and the predetermined reference data for all of said plurality of carriers are distributed among a prescribed number of the transmission symbols.

10. The transmitter device of claim 9, wherein the obtaining means obtains the transmission data sequence by placing the predetermined reference data among the valid transmission data such that, in an m-th transmission symbol, an n-th carrier carries the predetermined reference data for the n-th carrier only when a condition of "n mod k = m mod k" holds, where k, m, and n are integers.

11. The transmitter device of claim 7, wherein the modulator means modulates each of said plurality of carriers by a multi-level modulation.

12. The transmitter device of claim 7, wherein the obtaining means further comprises:
interleave matrix means for interleaving the valid transmission data;
reference data memory means for memorizing the predetermined reference data for each carrier;
switch means for selectively connecting one of the interleave matrix means and the reference data memory means to the modulator means so as to supply the transmission data sequence in which the predetermined reference data for each carrier memorized by the reference data memory means are placed among the valid transmission data interleaved by the interleave matrix means to the modulator means; and
switch control means for controlling an switching operation by the switch means according to a prescribed reference data position information indicating prescribed positions in the transmission data sequence at which the predetermined reference data are to be placed.

13. A receiver device for digital signal transmission frequency division multiplexing, comprising:
means for receiving transmission signals from a transmission path, the transmission signals being obtained by modulating a plurality of carriers with transmission data sequence in which predetermined reference data for each carrier are placed among valid transmission data, according to an orthogonal frequency division multiplexing (OFDM) modulation scheme, the predetermined reference data indicating amplitude and phase of prescribed reference points:
demodulator means for demodulating the transmission signals received by the receiving means to obtain received data sequence containing valid received data and received reference data; and
means for estimating valid transmission data from the received data sequence obtained by the demodulator means according to the valid received data, the received reference data, and said predetermined reference data for each carrier.

14. The receiver device of claim 13, wherein the transmission data sequence is given in units of frames, where each frame contains a plurality of transmission symbols and each transmission symbol is carried by said plurality of carriers, and estimating means estimates the valid transmission data $D_{MX}$ from the valid received data $D_{RX}$, the received reference data $S_{RX}$ and the predetermined reference data $S_{TX}$ by calculating an equation:

$$D_{TX} = D_{RX} - S_{TX}/S_{RK}$$

where $D_{TX}$, $D_{RX}$, $S_{TX}$, and $S_{RM}$ are complex numbers, for each carrier in each transmission symbol.

15. The receiver device of claim 13, wherein the predetermined reference data for each carrier is set to be different from the predetermined reference data for carriers other than said each carrier.

16. The receiver device of claim 13, wherein the transmission data sequence is given in units of frames, where each frame contains a plurality of transmission symbols and each transmission symbol is carried by said plurality of carriers, and the predetermined reference data are placed among the valid transmission data such that a fraction of said plurality of carriers for carrying said each transmission symbol carry the predetermined reference data while a remaining part of said plurality of carriers for carrying said each transmission symbol carry the valid transmission data, and the predetermined reference data for all of said plurality of carriers are distributed among a prescribed number of the transmission symbols.

17. The receiver device of claim 16, wherein the predetermined reference data are placed among the valid transmission data such that, in an m-th transmission symbol, an n-th carrier carries the predetermined reference data for the n-th carrier only when a condition of "n mod k=m mod k" holds, where k, m, and n are integers.

18. The receiver device of claim 13, wherein each of said plurality of carriers is modulated by a multi-level modulation.

19. The receiver device of claim 13, further comprising means for separating the valid received data and the received reference data from the received data sequence obtained by the demodulator means.

20. The receiver device of claim 19, wherein the separating means further comprises:
de-interleave matrix means for de-interleaving the valid received data;
received reference data memory means for memorizing the received reference data for each carrier;
switch means for connecting the demodulator means with one of the de-interleave matrix means and the received reference data memory means selectively such that the demodulator means is connected with the de-interleave matrix means while the demodulator means outputs sections of the received data sequence containing the valid received data, whereas the demodulator means is connected with the received reference data memory means while the demodulator means outputs sections of the received data sequence containing the received reference data; and
switch control means for controlling an switching operation by the switch means according to a prescribed reference data position information indicating prescribed positions in the received data sequence at which the received reference data are supposed to be placed.

* * * * *

UNITED STATES PATENT AND TRADEMARK OFFICE
CERTIFICATE OF CORRECTION

PATENT NO. : 5,406,551
DATED : April 11, 1995
INVENTOR(S) : Saito, Masafumi et al.

It is certified that error appears in the above-indentified patent and that said Letters Patent is hereby corrected as shown below:

Column 8 line 66, the equation should read:

$$D_{TX} = D_{RX} \cdot S_{TX}/S_{RX}$$

Column 10 line 66, the equation should read:

$$D_{TX} = D_{RX} \cdot S_{TX}/S_{RX}$$

Signed and Sealed this

Twelfth Day of August, 1997

Attest:

BRUCE LEHMAN

Attesting Officer

Commissioner of Patents and Trademarks